United States Patent
Giethoorn

[19]

[11] Patent Number: 6,118,859
[45] Date of Patent: Sep. 12, 2000

[54] TELECOMMUNICATIONS SYSTEM AND A SUBSCRIBER DEVICE

[75] Inventor: Harmen Giethoorn, Eindhoven, Netherlands

[73] Assignee: U.S. Philips Corporation, New York, N.Y.

[21] Appl. No.: 08/927,885

[22] Filed: Sep. 11, 1997

[30] Foreign Application Priority Data

Oct. 4, 1996 [EP] European Pat. Off. ............. 96202776

[51] Int. Cl.⁷ .................................................. H04M 1/56
[52] U.S. Cl. ..................... 379/142; 379/93.23; 455/415
[58] Field of Search .................. 379/142, 354, 379/355, 93.23, 93.17, 117, 118, 130, 140, 356, 357, 359; 455/415, 414

[56] References Cited

U.S. PATENT DOCUMENTS

| | | | |
|---|---|---|---|
| 4,924,496 | 5/1990 | Figa et al. ................................. | 379/142 |
| 5,386,460 | 1/1995 | Boakes et al. .......................... | 379/110 |
| 5,398,279 | 3/1995 | Frain ....................................... | 379/142 |
| 5,446,785 | 8/1995 | Hirai ....................................... | 379/142 |
| 5,479,493 | 12/1995 | Baker et al. ............................ | 379/142 |
| 5,553,125 | 9/1996 | Martensson ............................ | 379/142 |
| 5,568,546 | 10/1996 | Muratiak ................................ | 379/142 |
| 5,592,546 | 1/1997 | Takahashi .............................. | 379/142 |
| 6,005,927 | 12/1999 | Rahrer et al. .......................... | 379/142 |

FOREIGN PATENT DOCUMENTS

| | | | |
|---|---|---|---|
| 0355777A2 | 2/1990 | European Pat. Off. ....... | H04Q 11/04 |
| 0494526A2 | 7/1992 | European Pat. Off. ......... | H04M 1/72 |
| 0630141A2 | 12/1994 | European Pat. Off. ......... | H04M 3/42 |
| WO9717793 | 5/1997 | WIPO .............................. | H04M 1/57 |

*Primary Examiner*—Curtis A. Kuntz
*Assistant Examiner*—Rexford Barnie

[57] ABSTRACT

Known is a telecommunications system supporting adding calling party information to a call from a calling subscriber device to a called subscriber device. The called subscriber device comprises call logging means for logging unanswered calls in a date-time-stamp order. If the logging table is full, the oldest and last table entry is dropped from the logging table. This may result in undesired dropping of urgent frequent callers if the called party is absent and many callers having one call unanswered call after the frequent and urgent caller.

A telecommunications system is provided wherein per calling subscriber unanswered calls are counted. Logging table entries of frequent callers are updated, a call count value is displayed, and a previous entry is deleted. Frequent unanswered calls may be put on top of the logging table or the logging table may be sorted in a decreasing order of call count numbers.

9 Claims, 2 Drawing Sheets

TELECOMMUNICATIONS SYSTEM AND A SUBSCRIBER DEVICE

BACKGROUND OF THE INVENTION

The present invention relates to a telecommunications system comprising at least two subscriber devices comprising telephony functionality, which telecommunication system comprises means for adding calling party information to a call from a calling subscriber device to a called subscriber device, whereby the called subscriber device comprises call logging means for logging at least the calling party information in a logging table and display means for displaying logged calls.

The present invention further relates to a subscriber device for use in such a telecommunications system.

A telecommunications system and a subscriber device of the above kind are known from the article "Facilities for users of SOPHO-SET feature phones", Philips TDS Review, Vol. 48, No. 1, March 1990, C. J. Boltjes, pp. 20–27. On page 26, call logging is disclosed. If an incoming call is not answered the caller's number together with the date and time of the call are stored in the called party's telephone. If the telecommunications system also provides names of the calling party with the calling party information, the names will also be stored. If no name information is provided, the name of the caller will be stored if its name appears in a directory of the called party's subscriber device. When the called party has returned, he will be given an indication on the storage of non-answered calls by means of information on the display and a flashing LED on the "call logging key". With this key the subscriber can then scroll through the list of stored calls. A connection will be set up automatically to the destination whose number appears on the display by simply lifting the handset, i.e., without needing to dial this number. A problem arises when the logging table is full. Then the oldest entry will be dropped from the list despite of the fact that it could be a calling party that has made several unanswered calls already, most likely indicating that this party urgently wants to speak to the called party. Such a situation could occur easily if the frequently calling party had made several calls and thereafter a considerable number of less frequent calling parties had called. Missing urgent callers could have undesired consequences.

OBJECTS AND SUMMARY OF THE INVENTION

It is an object of the present invention to provide a telecommunications system of the above kind not having this drawback.

To this end the telecommunications system according to the present invention is characterized in that the call logging means are arranged to count calls and to update an entry in the logging table for the same calling subscriber device with a call count. Herewith, the logging table gets full less quickly and, besides, an urgent caller can be recognized easier because of having only one entry in the logging table and of being recognizable from a higher call count value.

In an embodiment of a telecommunications system according to the present invention the logging table is filled in an order of date and time for calling subscriber devices calling once without being called back and that for calling subscriber devices calling more frequently without being called back an entry is built on top of the logging table and a previous entry is deleted. Herewith all callers calling once are ordered according to date and time, but, advantageously, frequent calls get a priority treatment, i.e., they show up on top of the logging table if they are in a minority with respect to the callers calling once and, besides, they are easy recognisable from their higher count value. If there are not too many frequent caller having unanswered calls, the chance that they will be dropped from the logging table is greatly reduced.

In an alternative embodiment of a telecommunications system according to the present invention each time a calling subscriber device calls without being called back the logging table is sorted in an order of call count after updating of the logging table. Herewith all unanswered calls are continuously put in an order of most frequently calling parties. At least a number of these frequent callers most likely are urgent callers.

In a further embodiment of a telecommunications system according to the present invention the logging table is sorted on date and time for the same call counts. Herewith frequent callers having a last call at a later point in time but having the same call count appear higher in the logging table.

In a further embodiment of a telecommunications system according to the present invention an entry is deleted from the logging table if a calling party is called back. Herewith the logging table is automatically cleaned from unnecessary entries.

In a further embodiment of a telecommunication system according to the present invention a call count is erased from an entry if a calling party is called back. Herewith the entry stays on the logging table so that, when processing the calls on the logging table, the called party can easily see which calls have been dealt with. The called party can thereafter erase entries by scrolling through the logging table and by deleting no longer wanted entries. The call count could also be reset to zero after a call on the logging table has been made. A zero count can be replaced by a blank when displaying the corresponding entry.

In a further embodiment of a telecommunications system according to the present invention given call numbers of calling subscriber devices are flagged such that, if an unanswered call is received there from their entries are inhibited from deletion from the logging table. Herewith it is prevented that calls from parties known important beforehand are deleted from the logging table.

BRIEF DESCRIPTION OF THE DRAWINGS

The present invention will now be described, by way of example, with reference to the accompanying drawings, wherein FIG. 1 schematically shows a telecommunications system according to the present invention.

Throughout the figures the same reference numerals are used for the same features.

DETAILED DESCRIPTION OF THE PREFERRED EMBODIMENT

Figure 1:
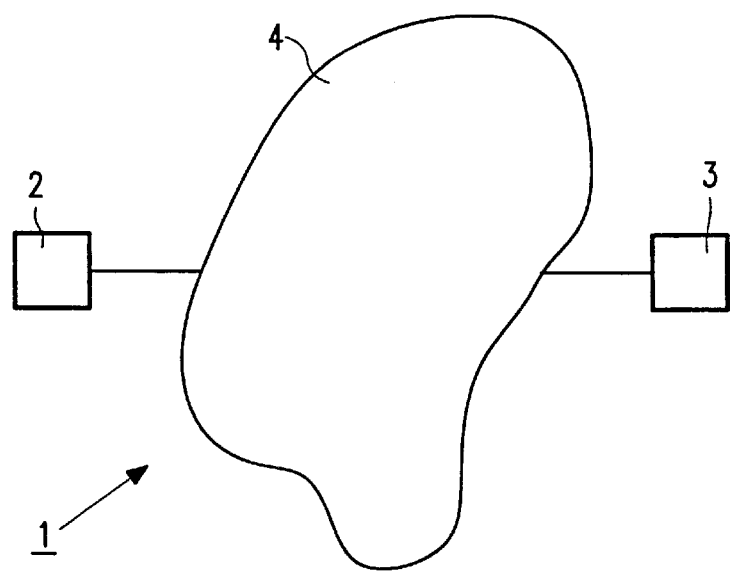

FIG. 1 schematically shows a shows a telecommunications system 1 according to the present invention comprising a first subscriber device 2 coupled to a second subscriber device 3 via a telecommunications network 4 which can be a public switched telecommunications network, a private network, a local wired or wireless network, or any other suitable network or local area network, or the like, suitable for at least telephony traffic. The system supports adding calling party information to a call from a calling subscriber device to a called subscriber device. Such a service can be given in a private network such as described in said TDS article but also a public service offered by a public network operator. The calling party information comprises a calling party number and may comprise a calling party's name. If no name is provided the called subscriber device can build up a telephone directory comprising number and names. If a call is received the called subscriber device can check the directory and add the name to a logging table entry of unanswered calling parties. The logging table will be filled if the called subscriber is absent. The subscriber devices can be wired or wireless device. As an example a wired subscriber device will be given and further a television set with built-in telephony functions.

Figure 2:
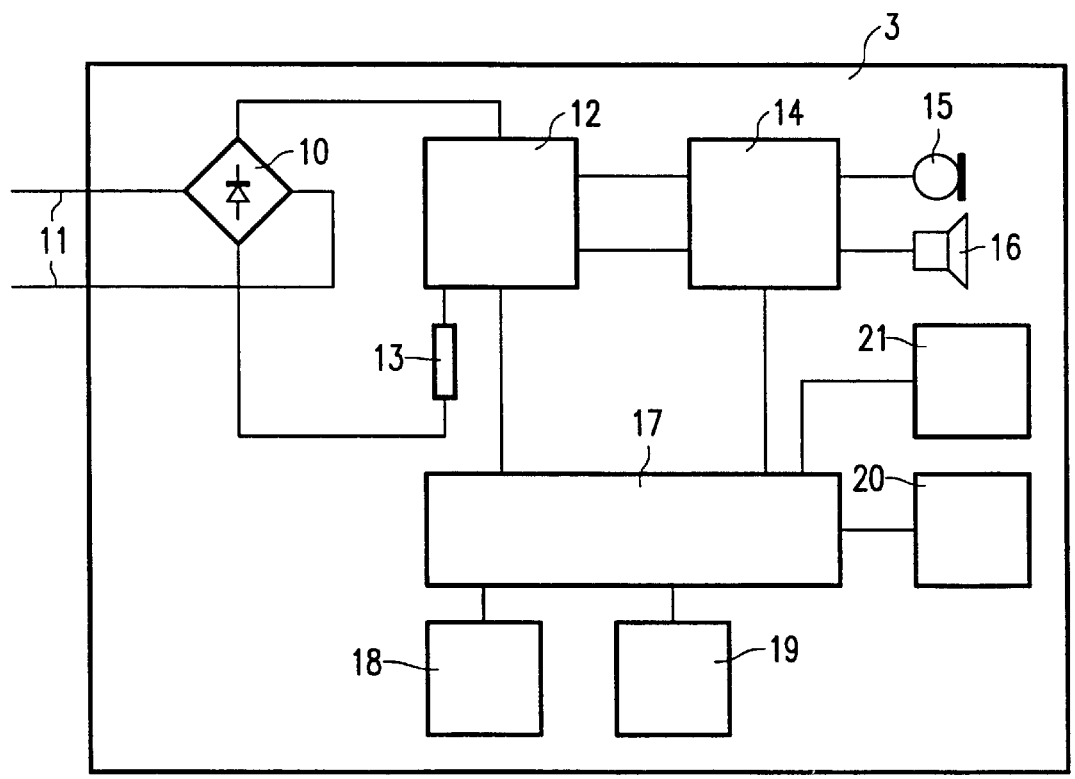
FIG. 2 shows a block diagram of a subscriber device for use in a telecommunications system according to the present invention.

FIG. 2 shows a block diagram of the subscriber device 3 as a called subscriber device for use in a telecommunications system according to the present invention. In the example given the calling subscriber device is the subscriber device 2. The subscriber device 3 comprises a diode bridge 10 coupled to a telephone line 11 for connection to the network 4. The diode bridge 10 is coupled to a series arrangement of a transmission-IC (Integrated Circuit) 12 and a slope resistor 13. The transmission-IC can be an IC-type from a TEA106x family, readily available onto the market. The subscriber device 3 further comprises a handsfree circuit 14 such as an IC-type TEA1094 readily available onto the market. The IC 14 is coupled to a microphone 15 and to a speaker 16. The subscriber device 3 further comprises a microcontroller 17 to which a ROM (Random Access Memory) 18 and a RAM (Random Access Memory) 19 are coupled. Furthermore, the subscriber device 3 comprises a keyboard 20 for entering data and a display 21 for displaying a logging table inter alia, as described. The ROM 18 is suitably programmed so as to carry out all functionality as according to the present invention, inter alia.

Figure 3:
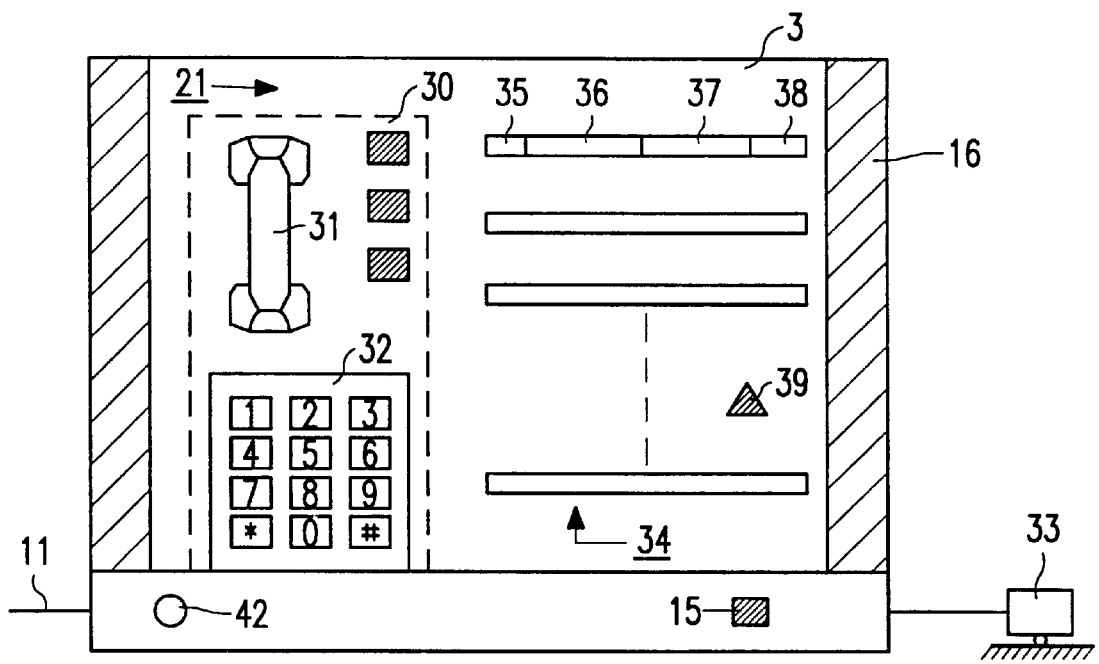
FIG. 3 shows a television set as a subscriber device.

FIG. 3 shows a television set as the subscriber device comprising all the telephony functionality as described with regard to FIG. 2. For using the television set as a handsfree telephone, audio, video and control circuitry of the set are shared for telephony functions. The ROM 18 is programmed to control the display 21 as a suitable multimedia screen for telephony. For telephony, the screen contains an area 30 with a handset pictogram 31 and a keyboard pictogram 32. With a device like a so-called mouse 33 relevant telephony functions can be selected and activated by clicking. Such functions include clicking on keys of the keyboard 32, taking the handset 31 off-hook, or the like. E.g., in the European patent application EP 0 630 141, in FIG. 49, a PC-telephone is shown having a WINDOWST™-like man-machine interface for telephony functions with clickable functions and pull-down menus. On the screen 21 a logging table 34 is shown with table entries comprising a call count 35, a calling party number 36, a calling party name 37, as the case may be, and a date-and-time stamp 38. Using the mouse 33 a cursor 39 can be moved along the logging table whereby table entries are highlighted when the mouse points thereto. Clicking a highlighted entry may initiate automatic dialing and automatic removal of an entry after a successful call. The logging table 34 can be stored in non-volatile read-write memory (not shown in detail).

EXAMPLE-1

Filling, updating and displaying the logging table 34 in an order of date and time for calling parties having one unanswered call and counting an putting entries on top for calling parties having more than one unanswered call.

| C-cnt 35 | CP-Number 36 | Name-37 | Date & Time-37 | Prohibit |
|---|---|---|---|---|
| 5 | 123212 | Smith | 9/10 12:10 | |
| 6 | 456451 | Moore | 8/10 19:00 | |
| 1 | 112214 | Gale | 9/10 14:05 | |
| 1 | 334412 | Jansen | 9/10 13:06 | |
| 1 | 456678 | Boss | 8/10 21:00 | * |
| 1 | 556789 | No-name | 7/10 09:05 | |

All calls still unanswered, Boss calls on 9/10 15:00.

Boss is put on top of the logging table above Smith. Boss is indicated with an * meaning the entry Boss may not be deleted from the logging table even if it is the last entry. In such a case a calling party having a call count one above a prohibited one can be deleted from the logging table. The previous entry Boss disappears from the logging table 34.

EXAMPLE-2

Filling, updating and displaying the logging table 34 in a decreasing order of counted most frequently calling parties having unanswered calls.

| C-cnt 35 | CP-Number 36 | Name-37 | Date & Time-37 | Prohibit |
|---|---|---|---|---|
| 6 | 456451 | Moore | 8/10 19:00 | |
| 5 | 123212 | Smith | 9/10 12:10 | |
| 5 | 455678 | Harris | 9/10 10:10 | |
| 1 | 112214 | Gale | 9/10 14:05 | |
| 1 | 334412 | Jansen | 9/10 13:06 | |
| 1 | 456678 | Boss | 8/10 21:00 | * |
| 1 | 556789 | No-name | 7/10 09:05 | |

All calls unanswered, Boss calls again on 9/110 14:00. Boss is put between Harris and Gale with a call count value of 2. The previous Boss entry is deleted and the logging table is made contiguous.

Now the called party returns and calls Boss. In one example call count 35 is replaced by a blank after a successful call. In another example the entry Boss is deleted after a successful call.

Figure 4:
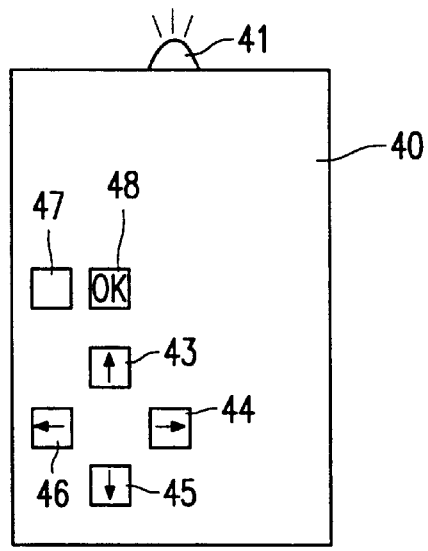
FIG. 4 shows a remote control device for a television set.

FIG. 4 shows a remote control device 40 for the television set 3 as shown in FIG. 3 comprising a remote control IR (Infra-Red) transmitter 41 for transmitting commands to a remote control IR-receiver 42 on the set 3. Instead of on screen control of the logging table with the mouse 33 and the function keys in the area 30 on the TV-display 21, the logging table can be controlled via keys on the remote control. To this end, the remote control device 40 comprises cursor controlling means formed by four keys with an arrow, keys 43, 44, 45 and 46. The keys 43 and 45 are used for scrolling through the logging table 34, inter alia. The key 44 can be used to select a logging table entry arrived at by means of the keys 43 and 45. Selection of a logging table entry can be indicated by highlighting the entry. Furthermore, the remote control device 40 comprises a menu-key 47 for selecting and activating the call logging function on the display 21 and a confirmation key 48 for activating automatic dialing of a selected telephone number in the call logging table 34.

What is claimed is:

1. A telecommunication system comprising at least two subscriber devices with telephone functionality, in which communication system a calling subscriber device comprises means for adding calling party information in a call to a called subscriber device, and the called subscriber device comprises call logging means for logging the calling party information in an entry of a logging table for unanswered calls, unanswered call counting means for incrementing a call count of unanswered calls per logged entry, sorting means for sorting the logged entries in a descending order of the call count per logged entry, and means for modifying a logged entry from the unanswered call logging table, the logged entry automatically being modified if a call corresponding to the entry is answered by the called subscriber device.

2. A telecommunication system according to claim 1, wherein the logging table is sorted on date and time for the same call counts.

3. A telecommunication system according to claim 1, wherein the means for modifying a logged entry modifies the logged entry by deleting the logged entry from the logging table.

4. A telecommunication system according to claim 1, wherein the means for modifying a logged entry modifies the logged entry by erasing a call count.

5. A telecommunication system as claimed in claim 1, wherein the means for modifying a logged entry modifies the logged entry by resetting a call count to zero.

6. A telecommunication system according to claim 1, wherein given call numbers of calling subscriber devices are flagged such that, if an unanswered call is received therefrom their entries are inhibited from deletion from the logging table.

7. A telecommunication system comprising at least two subscriber devices with telephone functionality, in which communication system a calling subscriber device comprises means for adding calling party information in a call to a called subscriber device, and the called subscriber device comprises call logging means for logging the calling party information in an entry of a logging table for unanswered calls, and ordering means for ordering once unanswered calls per logged entry in a date and time order, and for putting more frequently unanswered calls on top of the logging table above the once unanswered calls while at the same time deleting a once unanswered call entry for such a more frequently unanswered call, and means for modifying a logged entry from the unanswered call logging table, the logged entry automatically being modified if a call corresponding to the entry is answered by the called subscriber device.

8. A subscriber device comprising telephony functionality, for use in a telecommunication system comprising the subscriber device and another subscriber device comprising means for adding calling party information in a call to the subscriber device, which subscriber device comprises call logging means for logging the calling party information in an entry of a logging table for unanswered calls, unanswered call counting means for incrementing a call count of unanswered calls per logged entry, and sorting means for sorting the logged entries in a descending order of the call count per logged entry, and means for modifying a logged entry from the unanswered call logging table, the logged entry automatically being modified if a call corresponding to the entry is answered by the called subscriber device.

9. A subscriber device comprising telephony functionality, for use in a telecommunication system comprising the subscriber device and another subscriber device comprising means for adding calling party information in a call to the subscriber device, which subscriber device comprises call logging means for logging the calling party information in an entry of a logging table for unanswered calls, and ordering means for ordering once unanswered calls per logged entry in a date and time order, and for putting more frequently unanswered calls on top of the logging table above the once unanswered calls while at the same time deleting a once unanswered call entry for such a more frequently unanswered call, and means for modifying a logged entry from the unanswered call logging table, the logged entry automatically being modified if a call corresponding to the entry is answered by the called subscriber device.

\* \* \* \* \*